(12) United States Patent
Villien

(10) Patent No.: US 10,408,637 B2
(45) Date of Patent: Sep. 10, 2019

(54) METHOD AND DEVICE FOR COUNTING STEPS

(71) Applicants: COMMISSARIAT A L'ENERGIE ATOMIQUE ET AUX ENERGIES ALTERNATIVES, Paris (FR); MOVEA, Grenoble (FR)

(72) Inventor: Christophe Villien, Seyssinet-Pariset (FR)

(73) Assignees: Commissariat A L'Energie Atomique Et Aux Energies Alternatives, Paris (FR); Movea, Grenoble (FR)

( * ) Notice: Subject to any disclaimer, the term of this patent is extended or adjusted under 35 U.S.C. 154(b) by 261 days.

(21) Appl. No.: 15/106,773

(22) PCT Filed: Dec. 23, 2014

(86) PCT No.: PCT/EP2014/079211
§ 371 (c)(1),
(2) Date: Jun. 20, 2016

(87) PCT Pub. No.: WO2015/101567
PCT Pub. Date: Jul. 9, 2015

(65) Prior Publication Data
US 2017/0003140 A1 Jan. 5, 2017

(30) Foreign Application Priority Data
Dec. 31, 2013 (FR) ...................................... 13 63728

(51) Int. Cl.
*G01C 22/00* (2006.01)
*G01C 21/14* (2006.01)
*G01C 21/20* (2006.01)

(52) U.S. Cl.
CPC ........... *G01C 22/006* (2013.01); *G01C 21/14* (2013.01); *G01C 21/206* (2013.01)

(58) Field of Classification Search
CPC .................................................. G01C 22/006
See application file for complete search history.

(56) References Cited

U.S. PATENT DOCUMENTS

| 8,050,881 B1 * | 11/2011 | Yeung | A61B 5/0024 370/503 |
| 2004/0064286 A1 * | 4/2004 | Levi | G01C 21/12 702/141 |

(Continued)

FOREIGN PATENT DOCUMENTS

| EP | 1 619 475 A2 | 1/2006 |
| EP | 2 402 715 A2 | 1/2012 |

*Primary Examiner* — Hyun D Park
(74) *Attorney, Agent, or Firm* — BakerHostetler

(57) ABSTRACT

A step detection method comprises the following steps: a) based on at least one signal coming from at least one motion sensor rigidly attached to a portable device, detect events suitable to correspond to steps of a user carrying the portable device; b) based on at least one signal, or on at least one signal coming from another sensor also rigidly attached to the portable device, identify intervals of time during which the device is being manipulated; and c) identify as steps those, from amongst the events detected, which do not coincide with the intervals of time. A device for the implementing such a method, a mobile telephone and touchscreen tablet comprising such a device are also provided.

20 Claims, 9 Drawing Sheets

(56) References Cited

U.S. PATENT DOCUMENTS

| | | | |
|---|---|---|---|
| 2007/0143069 A1* | 6/2007 | Pasolini | G01C 22/006 702/160 |
| 2009/0298536 A1 | 12/2009 | Ikeda et al. | |
| 2009/0323888 A1* | 12/2009 | Fukutome | G01C 22/006 377/24.2 |
| 2012/0203496 A1* | 8/2012 | Sakai | G01C 22/006 702/141 |
| 2013/0085677 A1* | 4/2013 | Modi | A61B 5/112 702/19 |

* cited by examiner

METHOD AND DEVICE FOR COUNTING STEPS

CROSS-REFERENCE TO RELATED APPLICATIONS

This application is a National Stage of International patent application PCT/EP2014/079211, filed on Dec. 23, 2014, which claims priority to foreign French patent application No. FR 1363728, filed on Dec. 31, 2013, the disclosures of which are incorporated by reference in their entirety.

FIELD OF THE INVENTION

The invention relates to a method and to a device for counting steps (podometer). A device according to the invention may in particular be integrated into a portable device, such as a mobile telephone (notably of the "smartphone", or pocket terminal type) or a touchscreen tablet. The invention also relates to a mobile telephone or a touchscreen tablet incorporating such a device.

The invention is notably, but not exclusively, applicable to the field of inertial localization and navigation, and more particularly, of indoor localization and navigation.

BACKGROUND

Indoor localization has, for several years, been a very active subject of research given that there are many potential applications. Amongst the most promising technologies, the approach using inertial measurement seems to be the most mature for the general consumer applications.

The devices for navigation by inertial measurement combine one or more sensors, such as accelerometers, magnetometers and gyrometers, which are generally of the micro-electromechanical type. Such sensors are very often pre-installed in smartphones and touchscreen tablets.

The inertial methods for the navigation of pedestrians are aimed at estimating the relative displacement of an individual starting from a point of departure which can, for example, be input by the user.

The general principle of the processing may be thought of as the combination of a "podometer" and a "compass": the "podometer" detects the step of the user, which gives approximate information on the distance traveled, whereas the "compass" indicates in which direction the displacement takes place.

FIG. 1 shows a typical architecture of an intertial navigation system, receiving at its input signals Acc(t) produced by an accelerometer, Mag(t) produced by a magnetometer and Gyr(t) produced by a gyrometer (it is not obligatory for all three types of signals to be present). An orientation block OR combines the input signals in order to calculate the orientation $R_{RT}(t)$ of all of the sensors with respect to a reference frame. For this purpose, the accelerometer measures the direction of gravity, the magnetometer measures the direction of the magnetic field (north) and the gyrometer the speeds of rotation of the sensors. A fusion algorithm (typically an extended Kalman filter or EKF) allows the desired matrix which contains the information on direction to be calculated. See for example the document EP 2 402 715.

A "step detector" block, or podometer, PM uses principally the signals from the accelerometer for detecting the impacts caused by each step. It may also use the others signals, but this scenario is more rare. At the output, it produces two signals:

A signal flag(t) equal to "1" at the moment when the step is detected and "0" otherwise;

A signal freq(t) which indicates the frequency of the steps.

These two signals are subsequently used by a block MLP containing models for length of step as a function of the frequency in order to estimate the distance d(t).

Finally, a last block TRAJ combines the information on distance and on orientation in order to calculate coordinates x(t), y(t).

This example is non-limiting.

The invention relates to a step detector which may be used as a block PM in an inertial navigator of the type in FIG. 1. Such a step detector is also applicable to other applications, such as the estimation of the number of calories consumed during a walk.

Amongst the very numerous techniques for step detection known from the prior art, that described in the document US 2013/0085677 may be mentioned. It uses only the signals $a_x(t)$, $a_y(t)$, $a_z(t)$ coming from a three-axis accelerometer; these signals are processed for determining the norm of the acceleration $\|a(t)\|$ which is subsequently filtered. The detection of the steps is carried out by thresholding of the signal $\|a(t)\|$. Such a detection method is simple to implement and sensitive (low rate of missed detections); however it exhibits a relatively high rate of false alarms, in other words of spurious detections which occur while the person wearing the podometer is not walking. In the aforementioned document US 2013/0085677, this problem is attenuated, but not really solved, by a technique of adaptive filtering of the frequency of the detected steps.

SUMMARY OF THE INVENTION

The invention aims to provide a step detector which is simple, sensitive (low rate of missed detections) and robust, in other words exhibiting a low rate of false alarms.

The present inventors have realised that a major cause of the false alarms is constituted by the manipulations of the detector, in particular when the latter is integrated into a portable device such as a "smartphone" or a touchscreen tablet. The term "manipulation" refers to an intentional movement of the device caused by its user, for example when he/she removes it from a pocket or from a purse, approaches it to his/her face to make a telephone call, passes it to another person, etc.

Thus, according to the invention, the events that could correspond to steps but are detected during a phase of manipulation of the portable device incorporating the detector are set aside, and are not counted as steps.

One subject of the invention is therefore a method for detection of steps comprising the following step:

a) based on at least one signal coming from at least one motion sensor rigidly attached to a portable device, detect events suitable to correspond to steps of a user carrying said portable device;

characterized in that it also comprises the following steps:

b) based on said or on at least one said signal, or on at least one signal coming from another sensor also rigidly attached to said portable device, identify intervals of time during which said device is being manipulated; and c) identify as steps those, from amongst the events detected, which not coincide with said intervals of time.

According to particular embodiments of such a method:

Said step a) may comprise the following sub-steps:

a1) acquire three signals representative of three non-coplanar components of said acceleration to which said portable device is subjected;

a2) detect said events using said three signals, by detection and thresholding of local maxima of a fundamental spectral component of a quantity chosen from between the norm of the acceleration to which said portable device is subjected and the projection of said acceleration onto a vertical axis.

Said sub-step a2) may comprise the calculation of said norm of the acceleration to which said portable device is subjected based on said signal or signals acquired and its bandpass filtering.

As a variant, said sub-step a2) may comprise the calculation of said projection onto said vertical axis of the acceleration to which said portable device is subjected based on said signal or signals acquired and its bandpass filtering.

Said bandpass filtering may comprise a pass band of width not greater than 1 Hz and having a central frequency in the range between 1 Hz and 2 Hz.

Said sub-step a2) may comprise a said detection of local maxima by comparison between three successive samples of a signal representative of the fundamental spectral component of the norm, or of the projection of said acceleration onto a vertical axis and in which, after the detection of a local maximum, another local maximum can only be detected after said signal has fallen below a threshold referred to as lower threshold.

Said sub-step a2) may comprise an adaptive thresholding of said local maxima.

During said step b), said intervals of time during which said device is being manipulated may also be detected using said three signals representative of three non-coplanar components of said acceleration to which said portable device is subjected.

Said step b) may comprise the following sub-steps:

b1) determine, at a succession of moments in time, the orientation of the vertical direction in a reference frame attached to said portable device;

b2) calculate, for each said moment, the angle formed by the orientation of said vertical direction in said reference frame and a reference orientation;

b3) detect a manipulation when said angle exceeds a first threshold; and b4) subsequent to the detection of a said manipulation, consider that it is in progress for a given period of time.

As a variant, said step b) may also comprise the following sub-step:

b3') detect a manipulation also when said angle exceeds a second threshold, lower than said first threshold, a manipulation being already considered in progress.

In both cases, said step b) may also comprise the following sub-step:

b5) when a manipulation is detected at a time called detection time, take as new reference orientation the orientation of said vertical direction at said detection time.

As a variant, during said step b), said reference orientation may be chosen equal to the orientation of said vertical direction at a prior moment in time, preceding a current moment in time by a period in the range between 0.5 and 5 seconds.

Said step c) may comprise an operation for re-synchronization between the events detected during said step a) and the intervals of time during which said device is being manipulated, identified during said step b), said re-synchronization operation comprising a compensation for the differences between the latencies of said steps a) and b).

Said step c) may also comprise an operation for prolonging said intervals of time before the moment of their detection.

The method may also comprise a step d) for measuring a repetition frequency of the detected steps.

Another subject of the invention is a step detection device comprising: at least one motion sensor, rigidly attached to a portable device; and a processor connected to said sensor for receiving at its input at least one signal coming from it, said processor being configured or programmed for implementing a method such as mentioned hereinabove. In particular, said or at least one said motion sensor may be a three-axis accelerometer.

Yet another subject of the invention is a mobile telephone comprising such a device.

Yet another subject of the invention is a tablet comprising such a device.

BRIEF DESCRIPTION OF THE DRAWINGS

Other features, details and advantages of the invention will become apparent upon reading the description presented with reference to the appended drawings given by way of examples and which show, respectively.

DETAILED DESCRIPTION

The invention is based on the following comments:

When a user is effectively walking, the "useful" signal (from the walking) dominates the spurious signals, meaning that a relatively simple processing is perfectly well adapted for the detection of the steps with a low rate of missed detections.

The false alarms are almost exclusively caused by the manipulations of the portable device (smartphone or tablet), which generally occur when stationary and generate accelerations certain components of which are identical to those of the walking signal; there is therefore an overlap with the spectrum of the signals generated by the manipulations, which makes it difficult to differentiate the two scenarios.

Figure 1:
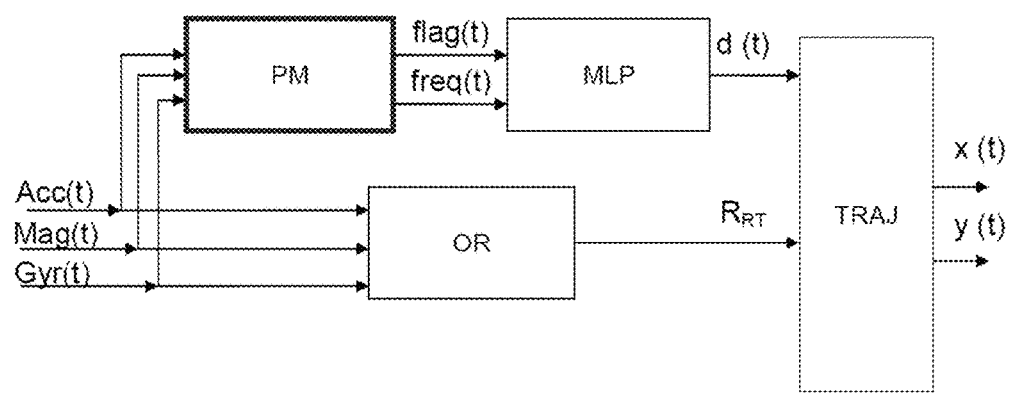
FIG. 1, shows a typical architecture of an inertial navigation system.
Figure 2:
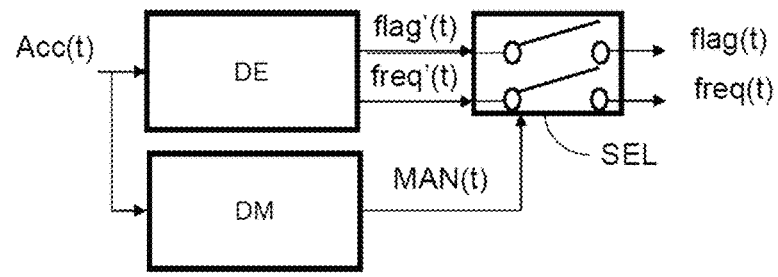
FIG. 2, a block diagram illustrating the principle of operation of a step detection method or device according to one embodiment of the invention.

A step detector according to the invention is illustrated in FIG. 2. A block DE receives at its input the signals Acc(t) coming from an accelerometer and carries out a "simple" detection of events suitable to represent steps; it supplies at the output a binary signal (or "flag") flag'(t) indicative of the presence of such events (flag'=1 when an event is detected, flag'=0 otherwise) and a signal freq'(t) indicative of their frequency. A block DM receives at its input the same signals Acc(t) and carries out a detection of manipulations. It supplies at the output a signal MAN(t) indicative of a manipulation in progress (MAN=1 when a manipulation is in progress, MAN=0 otherwise). A selection block SEL receives at its input the signals flag'(t), freq'(t), MAN(t) and supplies at the output signals flag(t), freq(t) corrected for the false alarms. In other words, flag(t)=1 only if flag'(t)=1 and MAN(t)=0, in other words when an event is detected in the absence of manipulations.

As a variant, the frequency freq(t) could be calculated directly from the validated steps flag(t), without going via the intermediate signal freq'(t).

As a variant, the blocks DE and DM could receive different signals at the input, potentially not coming from (or not solely coming from) an accelerometer.

These various blocks may consist of dedicated electronic circuits, analog or digital, or—preferably—be software blocks, corresponding to operations executed by a processor.

The manipulations detected by the block DM correspond to significant changes in the orientation of the telephone with respect to an inertial reference frame, whereas the walking only results in small rotations, which furthermore constitute a part of the useful signal used for the detection of the steps. In principle, other types of movements may lead to false alarms, such as for example abrupt accelerations without rotation, but it has been experimentally observed that these cases are very rare in normal use.

Figure 3:
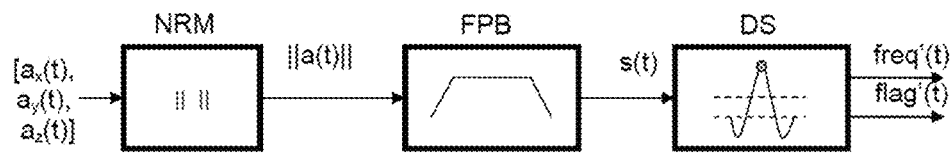
FIG. 3, a block diagram illustrating the detection of events suitable to correspond to steps according to one embodiment of the invention.

The various steps of the processing carried out by the event detection block of are illustrated in FIG. 3. The input signal Acc(t) is more precisely composed of three scalar signals $a_x(t)$, $a_y(t)$, $a_z(t)$, representative of the components of the acceleration along three orthogonal axes. A block NRM calculates the norm of the acceleration: $\|a(t)\| = \sqrt{a_x^2(t)+a_y^2(t)+a_z^2(t)}$. Then, the signal $\|a(t)\|$ thus obtained undergoes a bandpass filtering FPB. Lastly, the local maxima of the filtered signal s(t) are detected and compared with a threshold (potentially an adaptive threshold); only the maxima exceeding this threshold are retained. The reference DS indicates the detection and thresholding block.

Figure 4:
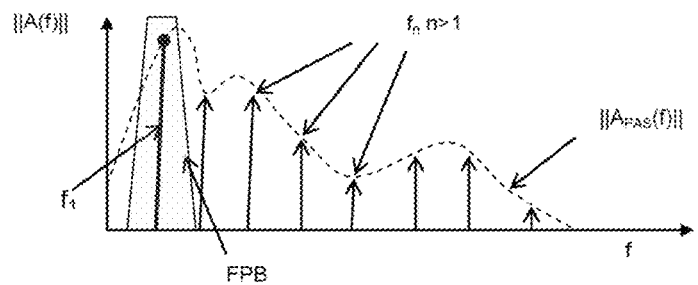
FIG. 4, an illustration of the of bandpass filtering step used for said detection of events suitable to correspond to steps according to one embodiment of the invention.

FIG. 4 illustrates the spectrum $\|A(f)\|$ of the signal $\|a(t)\|$. A perfectly regular walking step is assumed, which implies a periodic signal $\|a(t)\|$, and hence a discrete spectrum composed of equi-spaced spectral lines with frequencies $f_n$ (n integer); the fundamental frequency $f_1$ is the repetition frequency of the steps. The spectral lines are modulated by an envelope which corresponds to the (continuous) spectrum of the acceleration for an individual step, $\|A_{PAS}(f)\|$. As walking is not a perfectly periodic phenomenon, in reality the spectral lines are not Dirac deltas, but have a finite spectral width. The bandpass filtering FPB allows the fundamental spectral component (the first line at the frequency $f_1$) to be selected. The central frequency of the filtering band is typically in the range between 1 Hz and 2 Hz, and the band width is less than or equal to 1 Hz. Optionally, the filtering may be adaptive, the central frequency of filtering being determined as a function of the signal freq'(t) or freq(t). The suppression of the spectral components of order higher than 1 eliminates the noise; the suppression of the very low frequencies eliminates the gravitational component of the signal $\|a(t)\|$.

Figure 5A:
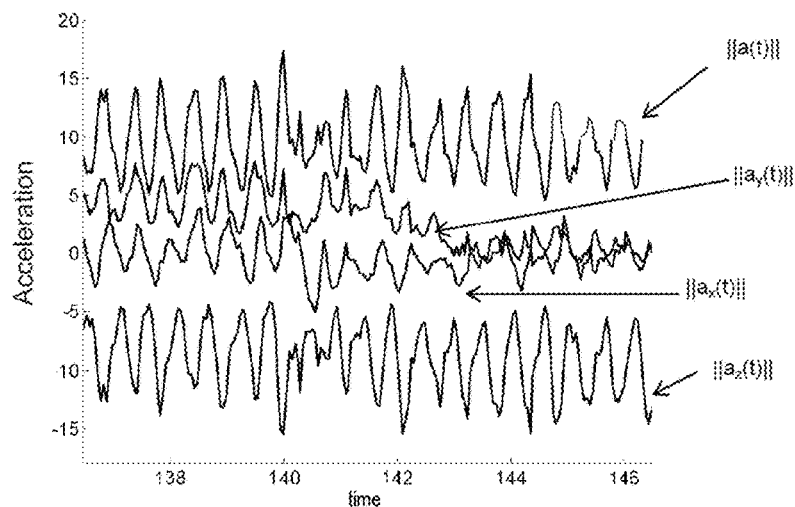
FIGS. 5A, 5B and 5C, raw (5A) and pre-processed (5B, 5C) accelerometer signals involved in said detection of events suitable to correspond to steps according to one embodiment of the invention.
Figure 5B:
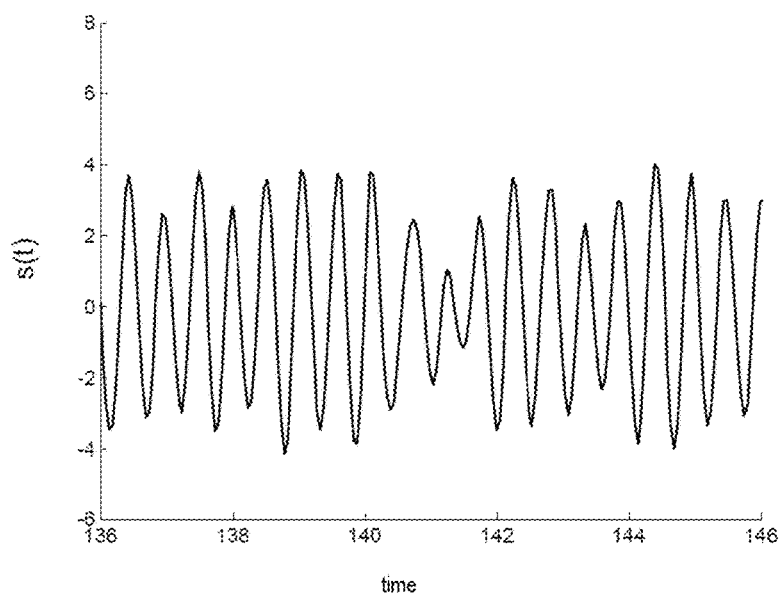

FIG. 5A shows the time behavior profiles of the signals $a_x(t)$, $a_y(t)$, $a_z(t)$ and $\|a(t)\|$; FIG. 5B, that of the filtered signal s(t). The latter signal is substantially sinusoidal, which simplifies the detection and the thresholding of the local maxima by the block DS.

The signal 5C shows the time behavior profiles of the signals s(t)—thin line—and MAN(t)—thick line—during a manipulation phase while stationary, 510, and during a walking phase with no manipulation, 520. It is not immediately obvious to distinguish between the two phases by simple observation of the signal s(t).

The search for the maxima may be carried out by comparing three samples of the signal s(t) taken at the times t1, t2 and t3. A maximum is detected at the time t2 if s1≤s2 and s3<s2 with s1=s(t1), s2=s(t2) and s3=s(t3).

Typically, the times t1, t2 and t3 are only separated by one sampling period (generally of the order of 10 ms) and are chosen as follows:
t3=t is the last sample measured, that of the current time;
t2=t−τ, is the penultimate sample measured;
t1=t−2τ, is the pre-penultimate sample measured.

The local maximum found is only retained if it satisfies two cumulative conditions:
a thresholding: s2>S or s2≥S, which ensures that only the "significant" maxima (and not those due to noise) are detected;
a sufficient separation with respect to the last maximum detected.

The thresholding may notably be adaptive, for example if the threshold S is defined as a function of the preceding maximum or maxima detected. The separation between the maxima detected is ensured in the following manner: after the detection of a local maximum, another local maximum can only be detected after said signal has fallen below a "lower" threshold which may notably be expressed as a function of the value of the last preceding maximum.

Figure 6:
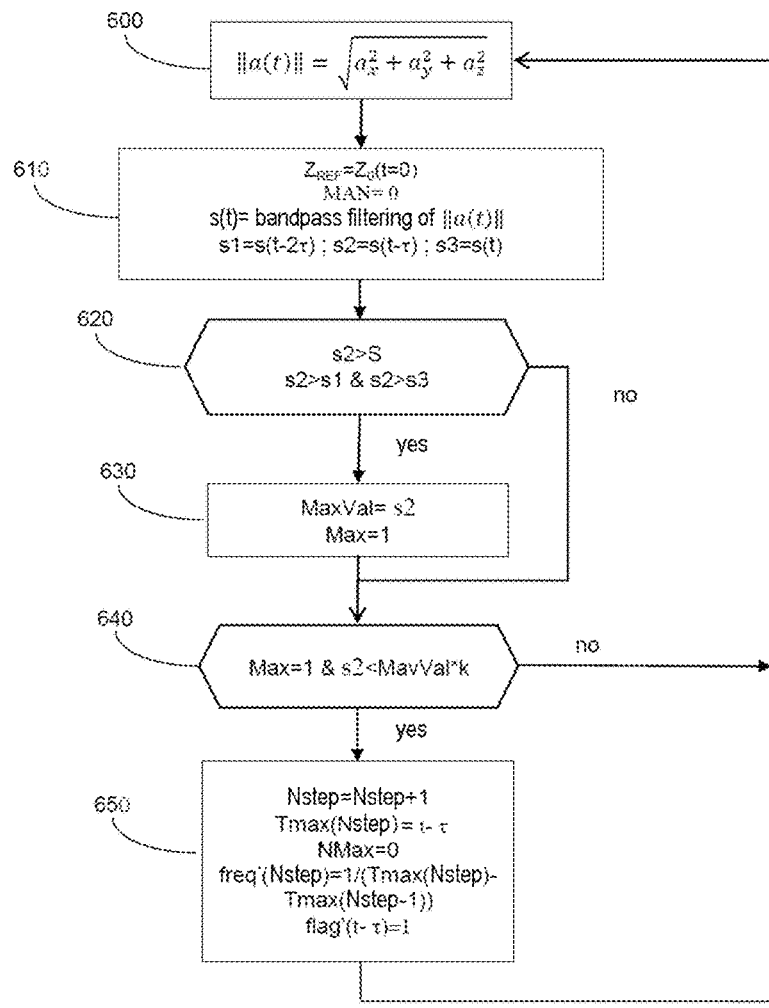
FIG. 6, a flow diagram illustrating a method for detection of events suitable to correspond to steps according to the embodiment of the invention in FIGS. 3 to 5C.

Each local maximum thus identified and retained constitutes an event suitable to represent a step. The various steps of the method for detecting such events are illustrated on the flow diagram in FIG. 6. The block 600 represents the calculation of the norm of the acceleration; the block 610, its bandpass filtering and the extraction of the samples s1, s2 and s3, the block 620 the search for the local maxima ("&" is the symbol for the logic operator "AND"). If a local maximum is detected (branch "yes" after the block 620), a temporary variable MaxVal takes the value of said maximum (MaxVal=s2) and another temporary variable Max takes the value 1, in order to indicate that a new maximum has been detected (block 630). The block 640 verifies that the separation condition between maxima is satisfied: the detection of a local maximum is only validated when the instantaneous value of the signal, s2 (or s3), is less than k·MaxVal, with k<1 (for example k=0.8). When a maximum has been detected (condition Max=1) and validated (condition s2<k·MaxVal), then (block 650):
a step counter Nstep is incremented (optional);
the time corresponding to the maximum detected (t-'r) is stored in the variable Tmax(Nstep);
the frequency freq' is given by the inverse of the interval between the last and the penultimate maximum detected;
the signal flag'(t−τ) takes the value 1;
the temporary variable Max is reset to zero.

According to an alternative embodiment, the detection of the events suitable to represent steps may be carried out by taking into account, instead of the norm of the acceleration signal, its projection onto the vertical axis. In such an embodiment:

Each component ($a_x$, $a_y$, $a_z$) of the signal from the accelerometer is filtered by means of a low-pass filter, the cut-off frequency being in the range between 0.1 Hz and 0.5 Hz, typically 0.3 Hz, so as to generate filtered components ($a'_x$, $a'_y$, $a'_z$), the latter being considered as an estimation of the components of the force of gravity (and hence of the vertical axis) in the reference frame of the sensor The acceleration vector generated by the accelerometer is projected onto the vertical axis thus estimated.

Thus, according to this variant, the step detection algorithm is supplied by the signal $$s(t) = \frac{(a_x(t)a'_x(t) + a_y(t)a'_y(t) + a_z(t)a'_z(t))}{\|a'(t)\|}$$

the normalization (division by $\|a'(t)\|$) being optional.

Figure 5C:
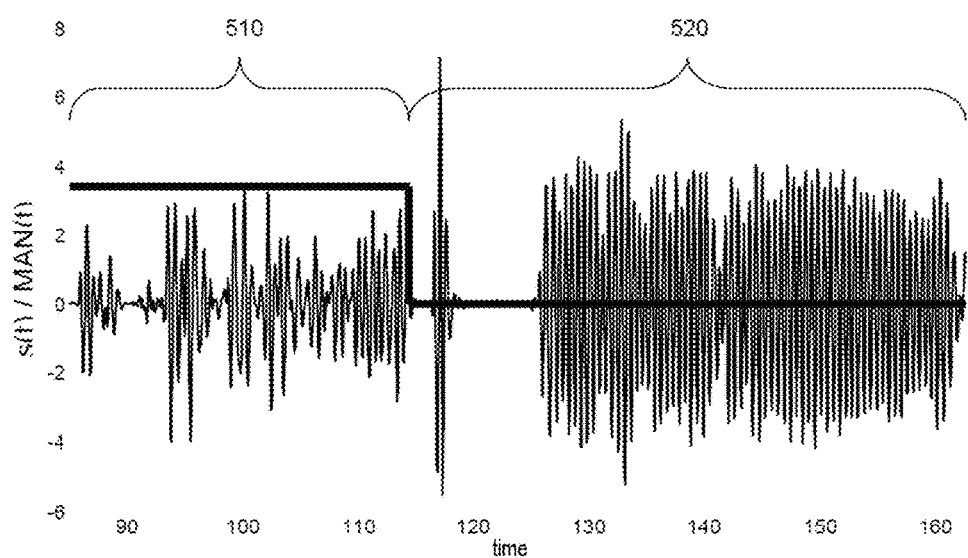

As may be realized by observing FIG. 5C, this method—whether its first or its second variant is considered—leads to the detection of steps not only during a walking phase (520), but also when a portable device incorporating a podometer according to the invention is manipulated; hence the advantage of the selection operation discussed with reference to FIG. 2.

Before concentrating on techniques for detection of the manipulations, the problem of the re-synchronization between this detection and that of the steps should be considered, together with the compensation for the delay in detection of the manipulations. Indeed, there will generally be a difference in latency between the blocks DE and DM in FIG. 2.

For example, assuming that the steps (more exactly, the events suitable to be steps) are detected instantaneously by the block DE but that the detection of the manipulations is carried out with a latency of 3 seconds. This latency is essentially due to the signal duration that needs to be stored in order to be able to apply the detection algorithm, respectively for the steps and for the manipulations. If nothing is done to compensate for this difference, the events detected during the first three seconds of the manipulation will be validated whereas they should have been set aside, and conversely, those detected during the first three seconds after the end of the manipulation will be set aside whereas they should have been validated.

Figure 7:
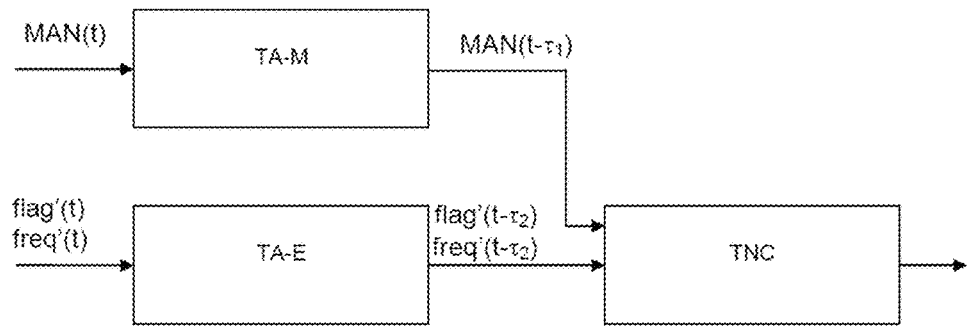
FIG. 7, a block diagram illustrating operations for re-synchronization of the detections of the events suitable to correspond to steps and manipulations, and to compensate for the processing times, according to one embodiment of the invention.

As illustrated in FIG. 7, this compensation for the differences in latency is provided by two "alignment buffers" TA-M (for the manipulations) and TA-E (for the events suitable to be steps). These buffers, which may be simple FIFO (First-In, First-Out) memories, introduce delays $\tau_1$ and $\tau_2$ allowing the output signals from the blocks DE and DM to be "aligned". A single alignment buffer may be used by setting min($\tau_1$, $\tau_2$)=0, because the alignment depends on the difference $|\tau_1-\tau_2|$. If the latencies, or their difference, are negligible, the alignment buffers may be omitted.

The block TNC, which receives at its input the aligned signals at the output of the buffers TA-M and TA-E, applies a "non-causal" processing in order to take into account the fact that a manipulation is only detected with a certain delay with respect to the moment in time when it has effectively begun. This detection delay must be distinguished from the latency of the processing (3 seconds in the preceding example) which is only due to the duration of the signal which has to be stored in order to apply the processing. For example, an algorithm for detecting the manipulations may have a delay of one second simply because detection thresholds do not allow the manipulation to be detected exactly at the moment when it begins, and a latency of 3 seconds corresponding to the duration of the signal that it has to store. In this case, the total delay between the actual moment in time when the event begins and that when it is effectively detected would be 4 seconds. The "non-causal" block TNC extends the manipulation time interval backward (before the moment of manipulation). Of course, this is only possible by delaying the signals MAN(t), freq'(t) and flag'(t).

Figure 8:
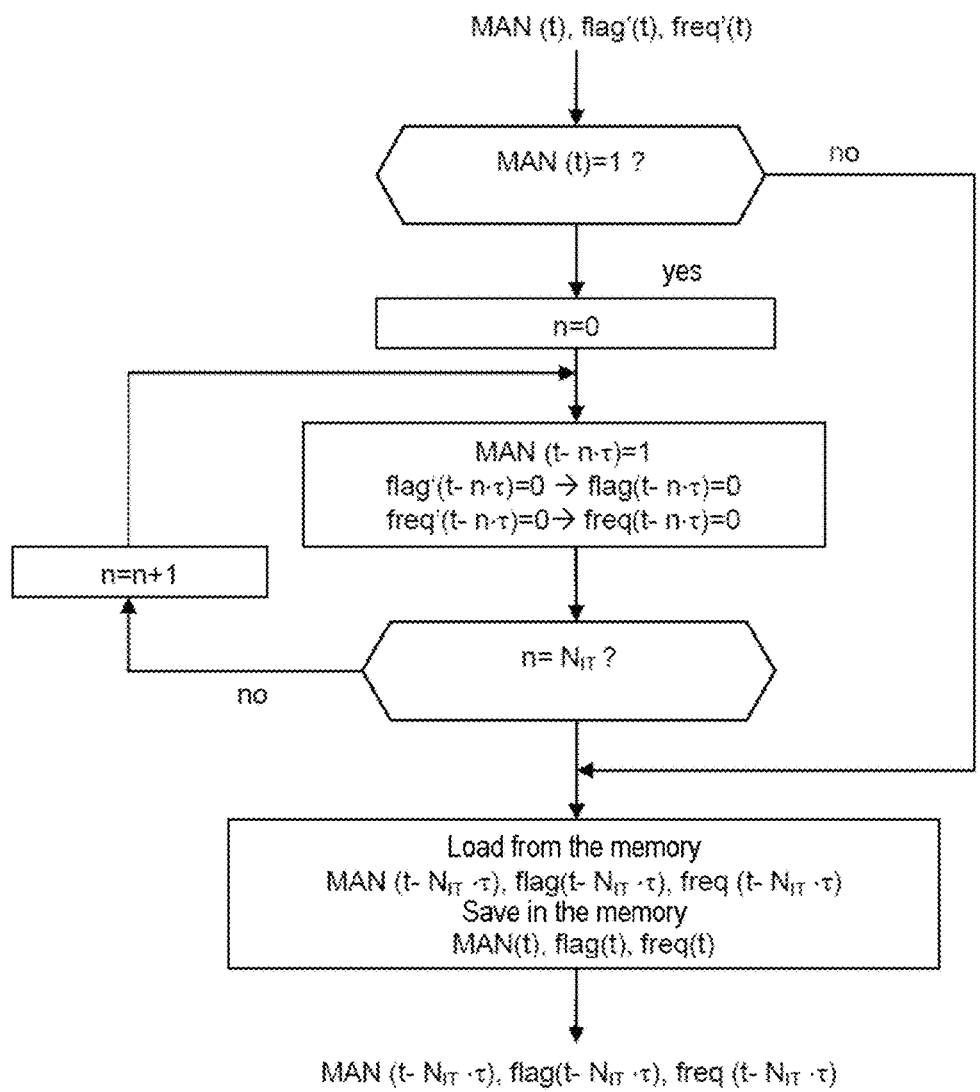
FIG. 8, a flow diagram of the operations in FIG. 7.

FIG. 8 is a block diagram for one embodiment of the "non-causal" processing implemented by the block TNC, carrying out at the same time the selection of the steps which, in the diagram in FIG. 2, is carried out by the block SEL. This processing is only carried out in the presence of a detected manipulation: MAN(t)=1. At least $N_{IT}$ samples of the signals MAN(t), freq'(t) and flag'(t) are stored in a FIFO memory, $N_{IT}$ being the number of samples corresponding to the detection delay for the manipulations, $N_{IT}\cdot\tau$. A loop is cycled $N_{IT}$ times in order to update the values of the samples in the memory: the $N_{IT}$ samples of the signal MAN are set to 1, those of the signals freq'(t)/freq(t) and flag'(t)/flag(t) to zero (the manipulation period is retroactively extended and the detections of the events are erased). Then, freq(t–$N_{IT}\cdot\tau$), flag(t–$N_{IT}\cdot\tau$) and MAN(t–$N_{IT}\cdot\tau$) are stored in the memory and freq(t), flag(t) and MAN(t) are loaded from the memory.

As a variant, the non-causal processing and the selection of the events could be carried out successively, rather than simultaneously.

Figure 9:
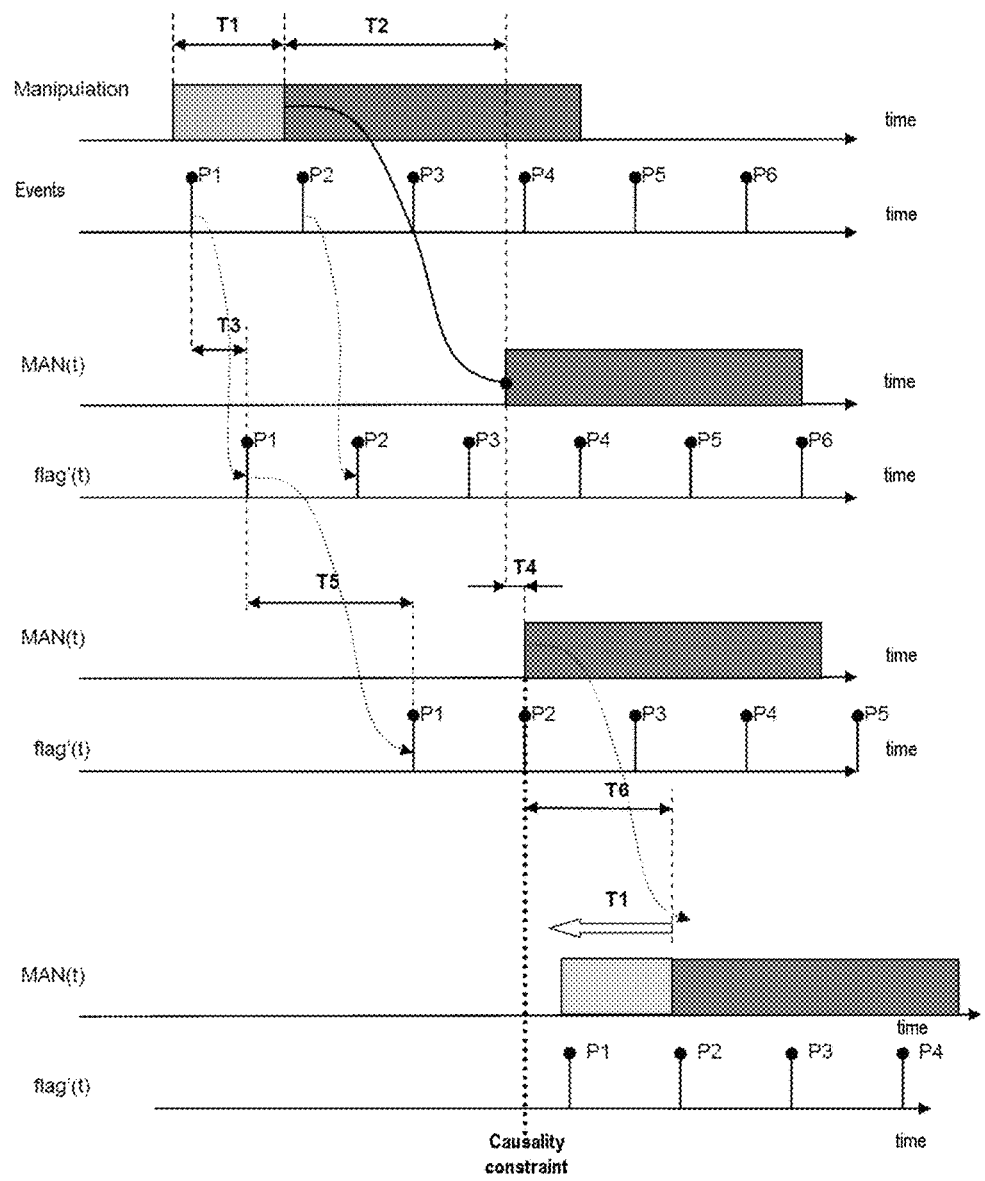
FIG. 9, a timing diagram of the operations in FIG. 7.

FIG. 9 is a timing diagram illustrating the temporal alignment operations and the non-causal processing.

The first line of this figure shows that a manipulation may be divided into two parts. The first part, with a duration T1 (light gray rectangle) corresponds to the effective start of the manipulation, whereas the second part (dark gray rectangle) shows the phase that is "detectable". This notion refers to the fact that, for a phenomenon such as manipulation to be effectively detected, the parameters characterizing the phenomenon need to have reached a certain level in order to get over a threshold. However, in order to avoid the false alarms, the value of the threshold must be such that there exists a margin between the natural fluctuations of the observed quantities and the detection level. The greater this margin, the longer the delay between the start of the phenomenon and the time when it is detected since the observed quantity will take a longer time to reach the threshold value.

The second line shows a succession of events which may correspond to steps, the first four of which (P1, P2, P3 and P4) are verified during the manipulation phase, and must therefore be set aside in accordance with the principle presented hereinabove with reference to FIG. 2.

The time T2 represents the interval of time between the moment when the manipulation is detectable in reality (first line) and the moment when it is effectively detected by the block DM in FIG. 2 (signal MAN(t) on the third line). This time is relatively long (several seconds) because, as will be explained further on, the detection of the manipulations impose the storage of a large number of samples—for example of the order of 1024.

The time T3, being shorter, represents the interval of time between the moment when an event suitable to be a step is verified (second line) and the moment when it is detected by the block DE in FIG. 2 (signal flag'(t) on the fourth line). The interval of time may for example be 0.5 seconds.

The difference between (T1+T2) and T3 means that the Manipulation signal MAN(t) is no longer synchronized with the signal flag'(t): in reality the manipulation covers the events P1 to P4, whereas at the output of the blocks DE, DM it coincides with the events P4 to P6.

The alignment buffers therefore introduce delays T4 and T5 on the signals "MAN(t)" and "flag'(t)" respectively, in such a manner as to re-synchronize them. The objective being that the total delays verify the following equality: T2+T4=T3+T5, this is not however sufficient, because the loss of the initial portion of the manipulation, of duration T1, has still not been compensated; as a consequence, the event P1 is still not considered as having taken place during a manipulation, and risks being counted as a step. It is the role of the block TNC for "non-causal" processing, described hereinabove with reference to FIGS. 7 and 8. In reality, this block must adhere to a causality constraint, so that the "back-propagation" of the signal MAN(t) must be accompanied by a delay T6>T1 applied both to MAN(t) and to flag'(t).

At the output of the block TNC, the signals MAN(t) and flag'(t)—seventh and eighth line in the figure—exhibit the same temporal relationship between them as the "real" manipulation and the "real" events in the first and second lines, but with a delay (T3+T5+T6)=(T2+T4+T6).

A first method for detection of the manipulations which may be used in the framework of the present invention will now be described with reference to FIGS. 10A, 10B and 11A. Such a method may also be used in other applications, independently from the step detection.

Figures 10A, 10B:
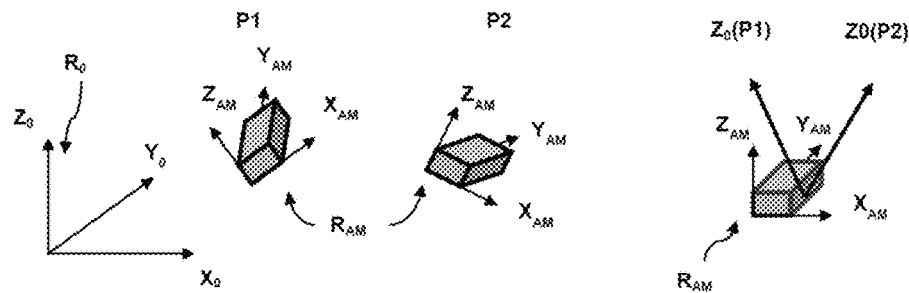
FIGS. 10A, 10B, 11A and 11B, a first method for detection of the manipulations.

FIG. 10A shows the orientation of the three-axis accelerometer AM, used both for the detection of the events and for that of the manipulation, in an inertial reference frame $R_0$ (axes $X_0$, $Y_0$, $Z_0$, the latter corresponding to the local vertical) for two positions P1 and P2 of the portable device incorporating the podometer of the invention. The figure also shows, in both positions, a reference frame $R_{AM}$ (axes $X_{AM}$, $Y_{AM}$, $Z_{AM}$) attached to the accelerometer, and hence mobile within the inertial reference frame. Assuming that the portable device is not subjected to violent accelerations, the accelerometer AM essentially measures the acceleration due to gravity, directed along the axis $Z_0$; in any case, the acceleration due to gravity is dominant if the case is limited to considering the low-frequency components (1 Hz or less) of the signals that it supplies. More precisely, irrespective of its position, the accelerometer AM supplies signals representative of the orientation of the axis $Z_0$ in its own reference frame $R_{AM}$.

FIG. 10B shows the accelerometer AM in its own reference frame $R_{AM}$. In this reference frame, the passage of the device from the position P1 to the position P2 corresponds to a change in orientation of $Z_0$, in other words of the vertical direction.

It is considered that a change of orientation of $Z_0$, with respect to a reference or "initial" orientation, exceeding a certain threshold s1, is indicative of a manipulation of the device. The threshold SD1 avoids the small oscillations caused by the walking of the user being taken into account; considering the changes of orientation of $Z_0$ allows the effect of the changes in heading of the users which do not modify this orientation, to be ignored (these are in fact rotations about the vertical axis $Z_0$). The threshold s1 is advantageously in the range between 15° and 45°, and preferably between 20° and 40°; for example, it may be 30°.

Figure 11A:
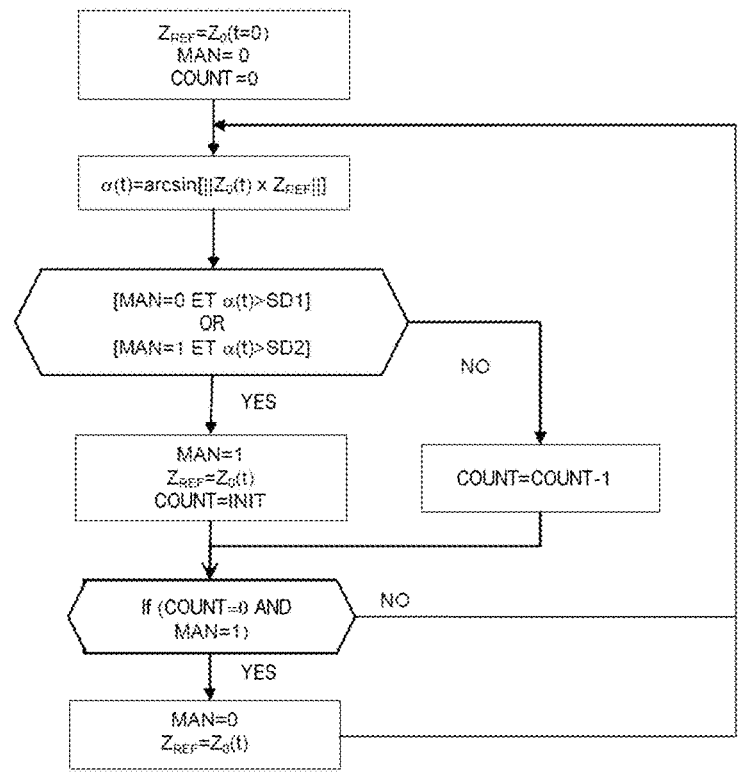

The flow diagram in FIG. 11A illustrates, in more detail, the implementation of such a method. Although not shown, it is considered that the signals coming from the accelerometer AM are subjected to a low-pass filtering with a cut-off frequency less than or equal to 1 Hz, and preferably less than or equal to 0.5 Hz, which allows the influences of the oscillations due to walking and to potential impacts to be minimized; this filtering is therefore different from that used for the detection of the events (steps). Furthermore, these signals are sampled—or under-sampled—at a frequency typically of the order of 200 Hz, but which may be higher (1 kHz or more) or lower (5-10 Hz or less). This sampling frequency may be variable; more generally, the orientation of $Z_0$ is considered at times separated by an average interval in the range between 1 second and 1 millisecond.

Firstly, the orientation of the axis $Z_0$ at the time t=0 is taken as initial orientation, or reference orientation, $Z_{REF}$. Furthermore, it is considered there is no manipulation in progress at the time t=0; the "flag" (binary variable) MAN is therefore set equal to zero. Furthermore, a counter COMPT is reset to zero.

Subsequently, at each time "t", the angle $\alpha(t)$ between the orientation of $Z_0$ in the reference frame $R_{AM}$, and the orientation of $Z_{REF}$, considered fixed in this reference frame, is determined. This angle can be determined by calculating the arc-sine of the vector product between $Z_{REF}$ and $Z_0$, whose accelerometer AM supplies the components along the axes $X_{AM}$, $Y_{AM}$, $Z_{AM}$ (it is considered that $\|Z_0\|^2=\|Z_{REF}\|^2=1$, which may be obtained by normalization):

$$\alpha(t)=\arcsin\left[\|Z_{REF}\times Z_0(t)\|\right]$$

Subsequently, the detection of the manipulations is carried out. A manipulation is detected if:

when the flag MAN is equal to 0, $\alpha(t) \geq SD1$; or if when the flag MAN is equal to 1, $\alpha(t) \geq SD2$, where SD2 is a second threshold less than SD1 and can be in the range, for example, between 5° and 25°.

The idea is that a manipulation often begins with a big change of orientation, then continues with smaller changes of orientation.

If a manipulation is detected (whether this be an "initial detection", with crossing of the first threshold SD1, or a "later detection", with crossing of the second threshold SD2):

the flag MAN goes to 1, in order to indicate that a manipulation is in progress;

the reference direction $Z_{REF}$ is updated, and takes the value of $Z_0$ at the moment of detection, $Z_0(t)$;

the counter COMPT takes a predefined value INIT which corresponds to a predetermined duration, generally of the order of 1 second.

If no manipulation is detected:

the counter COMPT is decremented by one unit (assuming it is not zero).

It is noted that the reference direction is updated to the value of $Z_0$ at the moment of detection "t", and this is when a manipulation is detected (MANIP=1), or at the end of a manipulation (MANIP goes from 1 to 0). In the absence of a manipulation detection (MANIP=0), the reference value is not updated.

Figure 11B:
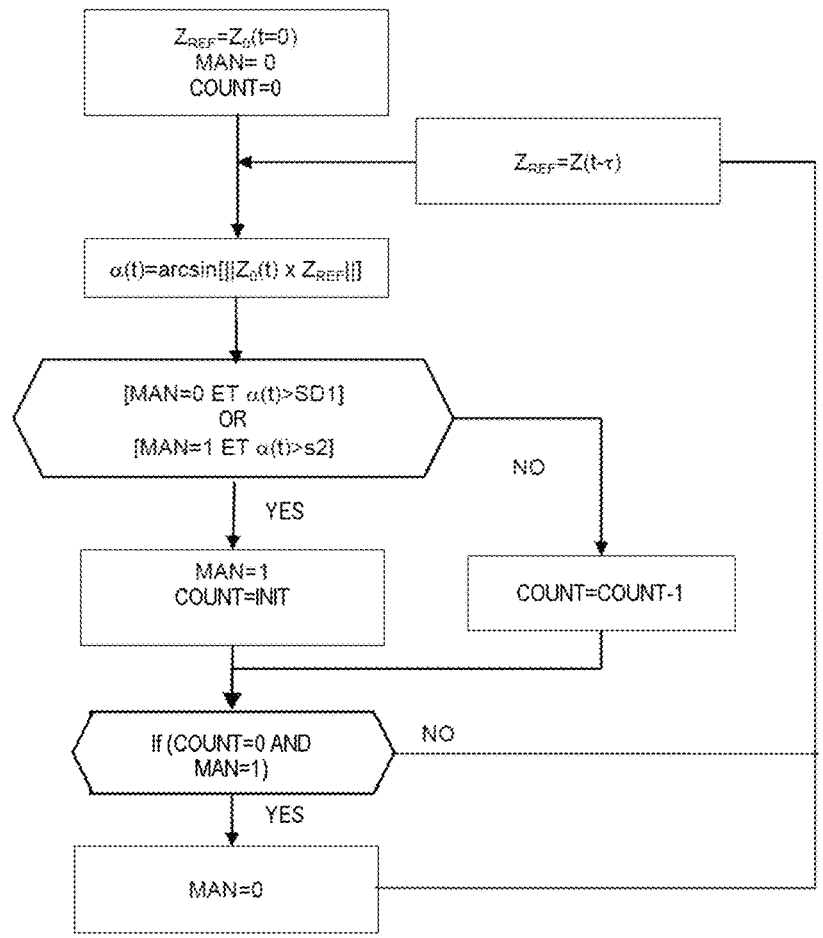

According to one variant, shown in FIG. 11B:

If a manipulation is detected (whether this be a "initial detection", with crossing of the first threshold SD1, or a "later detection", with crossing of the second threshold SD2):

the flag MAN goes to 1, in order to indicate that a manipulation is in progress; the reference direction $Z_{REF}$ is updated, and takes the value of $Z_0$ at a preceding time "t–τ", $Z_0$(t–τ);

the counter COMPT takes a predefined value INIT which corresponds to a predetermined duration, generally of the order of 1 second.

If no manipulation is detected:

the counter COMPT is decremented by one unit (assuming it is not zero); and the reference direction $Z_{REF}$ is updated, and takes the value of $Z_0$ at a preceding time "t–τ", $Z_0$(t–τ).

It is noted that, according to this variant, the reference direction is always updated to the value of $Z_0$ at a preceding time, and this is done at each iteration, whether a manipulation is detected or not. Preferably, the reference value is chosen to be equal to the value of $Z_0$ at the time t–τ, in other words shifted according to the time shift τ, the latter being most often in the range between 0.5 and 5 seconds, and typically of the order of one second. This time shift may be variable and adjusted experimentally.

The experience shows that this variant is more robust (fewer false positives), but less sensitive. Indeed, for a manipulation to be detected, the angular variation must take place within the interval of time τ.

It is noted that, according to this variant, the reference direction is updated to the value of $Z_0$ at the moment of detection "t", and this is when a manipulation is detected (MAN=1), or at the end of a manipulation (MAN goes from 1 to 0).

In the absence of a manipulation detection (MAN=0), the reference value is not updated.

When the counter COMPT takes the value zero, the flag MAN is reset to zero, otherwise it keeps its value. In any case, the method is repeated in an iterative manner. The use of the counter is based on the following principle: when a manipulation has been detected (whether this be an "initial detection", with crossing of the first threshold SD1, or a "later detection", with crossing of the second threshold SD2), it is considered that it continues for at least a predetermined minimum period of time, expressed by INIT. The decrement of the counter COMPT constitutes a countdown, which is reset at each detection of a manipulation. The manipulation is considered as finished (which is expressed by the return of the flag MAN to zero) when no detection— "initial" or "later"—has occurred during said predetermined period.

Numerous modifications to this method can be envisioned. For example, by way of non-limiting examples:

The accelerometer AM could be replaced by another sensor—for example a magnetometer sensitive to the Earth's magnetic field—but this would lead to additional complexity.

Only the threshold SD1 could be used; in this case, the detection of the manipulations would be carried out by verifying the single condition α(t)≥1 and would be independent of the value of the flag.

In this case, it would be possible to use neither a flag nor a counter. These elements are nevertheless useful if it is desired to distinguish a single manipulation which carries on for a certain time from a succession of shorter manipulations.

The equation α(t)=arcsin [$\|Z_{REF} \times Z_0(t)\|$] is only one possible way of determining the angle α(t).

The values of the thresholds SD1 and SD2, of the cut-off frequency, of the sampling frequency, of the average spacing between the times at which the orientation of the vertical direction is determined and of the minimum duration of a manipulation are given solely by way of non-limiting example, and dependent on the specific applications being considered.

Figure 12A:
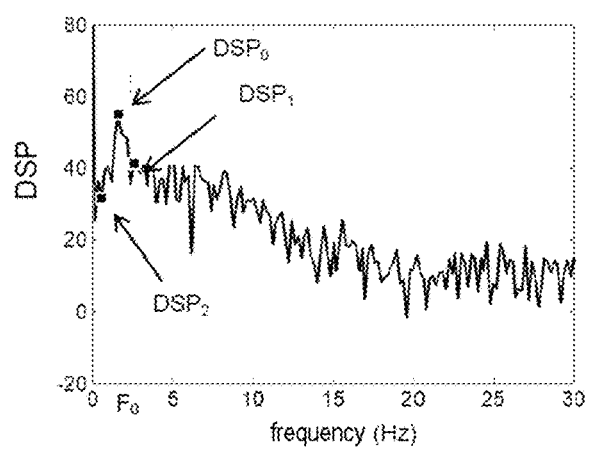
FIGS. 12A and 12B, a second method for detection of the manipulations.
Figure 12B:
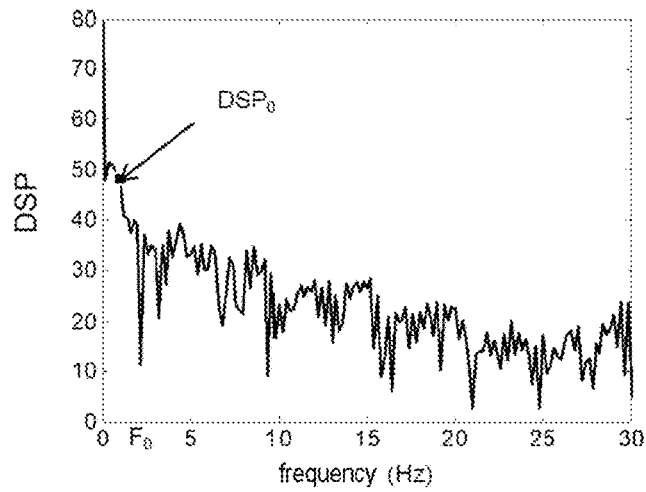

A second method for detection of the manipulations that may be used in the framework of the present invention will now be described with reference to FIGS. 12A and 12B. Such a method may also be used in other applications, independently of the step detection.

This second method relies on the fact that walking is periodic, in contrast to the manipulations. The idea is therefore to discriminate periodic signals from non-periodic signals. For this purpose, a Fourier transform is used applied to segments of the acceleration signal with a duration T, sufficiently long for each segment to comprise several steps. If, over the duration of the segment, the signal is periodic (and therefore corresponds to steps), then its spectrum will comprise well defined peaks ("spectral lines"), and notably one isolated peak at a frequency $F_0$ of the order of 1 to 3 Hz (frequency of the walking steps). This is clearly visible in FIG. 12A, whereas FIG. 12B corresponds to the spectrum of an acceleration signal acquired during a manipulation, and not exhibiting such a peak.

In other words, the frequency $F_0$ can be detected which, in the range 1-3 Hz, corresponds to the maximum of the spectrum (more precisely, of the power spectral density, DSP) of the acceleration signal; then, the maximum power spectral density $DSP_0$ at the frequency $F_0$ can be compared with the power spectral densities $DSP_1$ and $DSP_2$, respectively corresponding to the frequencies $F_0-\Delta F$ and $F_0+\Delta F$, with $\Delta F$ constant of the order of 0.5 Hz.

If $DSP_0 > K*DSP_1$ and $DSP_0 > K*DSP_2$ (K>1, for example=3), then the whole of the signal of the segment will be considered as corresponding to a walking action (MAN=0), otherwise it will be considered as corresponding to a manipulation (MAN=1)

The two methods for detection of the manipulations that have just been described are not in any way limiting.

Figure 13:
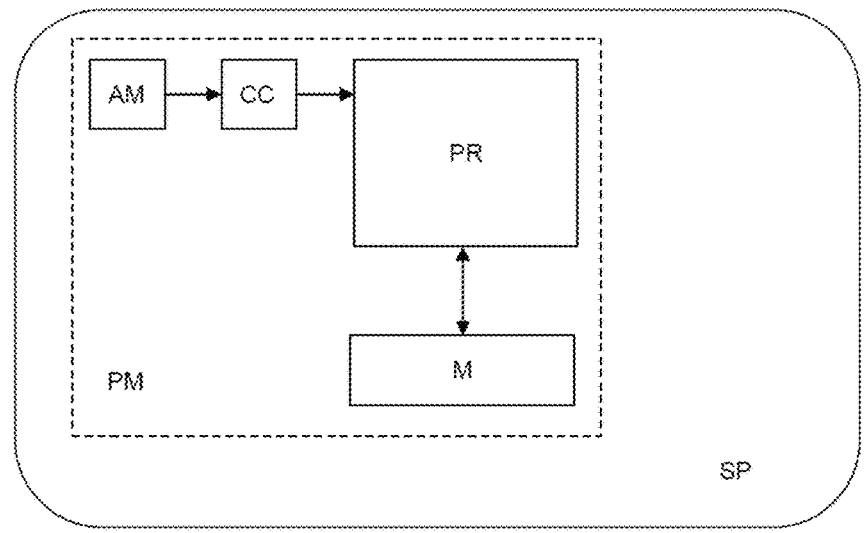
FIG. 13, a block diagram of a portable device, such as a mobile telephone or a touchscreen tablet, incorporating a step detection device according to one embodiment of the invention.

FIG. 13 shows schematically a portable device SP, such as a mobile telephone of the pocket terminal type or "smartphone" or a touchscreen tablet, incorporating a step detection device or podometer PM according to one embodiment of the invention. The latter comprises a three-axis accelerometer AM, fabricated using a MEMS (micro-electro-mechanical systems) technology, a conditioning circuit CC (filtering, sampling and conversion to the digital format) for the signals generated by said accelerometer, a processor PR receiving the signals thus conditioned and a memory M storing a program executed by said processor in order to implement a method according to the invention. It should be noted that these various elements are normally present in "smartphones", and also in other devices such as touchscreen tablets. Thus, modifications purely of a software nature can suffice for transforming a "smartphone" or a touchscreen tablet into a portable device according to the prior art capable of implementing the invention.

The invention claimed is:

1. A step detection method for providing a reduced number of false positives, the method comprising:
receiving, from at least one motion sensor attached to a portable device associated with a user, at least one signal;
generating, based on the received at least one signal and a detection of maxima in a norm of an acceleration of the portable device during a first time interval, a first signal associated with detected events associated with steps of the user of the portable device during the first time interval;

generating, based on the received at least one said signal, a second signal associated with a detected manipulation of the portable device by the user during a second time interval;

performing a re-synchronization operation comprising introducing a first delay in the first signal and a second delay in the second signal to enable compensation for differences in latencies between generating the first signal and generating the second signal; and detecting, based on the re-synchronization operation, steps of the user during the first time interval at points in time that do not coincide with the second time interval to thereby provide a reduced number of false positives.

2. The method of claim 1, wherein generating the first signal comprises receiving three signals representative of three non-coplanar components of an acceleration of the portable device and using said three signals by detection and thresholding of local maxima of a fundamental spectral component of a quantity chosen from between the norm of the acceleration and projection of the acceleration onto a vertical axis.

3. The method of claim 2, wherein using said three signals comprises calculation of said norm of the acceleration based on the received three signals and bandpass filtering of the received three signals.

4. The method of claim 3, wherein said bandpass filtering comprises a passband of width not greater than 1 Hz and having a central frequency in the range between 1 Hz and 2 Hz.

5. The method of claim 2, wherein using said three signals comprises calculation of said projection onto said vertical axis of the acceleration based on the received three signals and bandpass filtering of the received three signals.

6. The method of claim 2, wherein using said three signals comprises a detection of local maxima by comparison between three successive samples of a signal representative of the fundamental spectral component of the norm, or of the projection onto a vertical axis, of said acceleration, and wherein, after the detection of a local maximum, another local maximum can only be detected after said signal has fallen below a lower threshold.

7. The method of claim 2, wherein using said three signals comprises an adaptive thresholding of said local maxima.

8. The method of claim 2, wherein the second signal is generated using said three signals representative of three non-coplanar components of said acceleration.

9. The method of claim 1, wherein generating the second signal comprises:
   determining, at a succession of moments in time, an orientation of a vertical direction in a reference frame attached to said portable device;
   calculating, for each said moment in time, an angle formed by the orientation of said vertical direction in said reference frame and a reference orientation;
   detecting a manipulation when said angle exceeds a first threshold; and
   subsequent to the detection of said manipulation, determining that it is in progress for a given period of time.

10. The method of claim 9, wherein generating the second signal comprises:
    detecting, during a first manipulation, a second manipulation when said angle exceeds a second threshold that is lower than said first threshold.

11. The method of claim 9, wherein generating the second signal comprises:
    when a manipulation is detected, determining a second reference orientation of said vertical direction.

12. The method of claim 9, wherein when generating the second signal, said reference orientation is chosen to be equal to the orientation said vertical direction at a preceding time, preceding a current moment in time with a duration $\tau$ in the range between 0.5 and 5 seconds.

13. The method of claim 1, further comprising:
    measuring a repetition frequency of the detected steps.

14. The method of claim 1, wherein generating the second signal comprises determining, based on a comparison of spectral lines in an acceleration signal generated during the second time interval, whether a maximum power spectral density of the acceleration signal is associated with a manipulation.

15. A device configured for step detection for providing a reduced number of false positives, the device comprising:
    at least one motion sensor attached to a portable device; and
    a processor connected to said at least one motion sensor, said processor being configured or programmed for implementing a step detection method comprising the following steps:
    receiving, from at least one motion sensor attached to a portable device associated with a user, at least one signal;
    generating, based on the received at least one signal and a detection of maxima in a norm of an acceleration of the portable device during a first time interval, a first signal associated with detected events associated with steps of the user of the portable device during the first time interval;
    generating, based on the received at least one said signal, a second signal associated with a detected manipulation of the portable device by the user during a second time interval;
    performing a re-synchronization operation comprising introducing a first delay in the first signal and a second delay in the second signal to enable compensation for differences in latencies between generating the first signal and generating the second signal; and
    detecting, based on the re-synchronization operation, steps of the user during the first time interval at points in time that do not coincide with the second time interval to thereby provide a reduced number of false positives.

16. The device of claim 15, wherein said at least one motion sensor is a three-axis accelerometer.

17. The device of claim 15, wherein the device comprises a mobile telephone.

18. The device of claim 15, wherein the device comprises a touchscreen tablet.

19. The device of claim 15, wherein generating the second signal comprises:
    determining, at a succession of moments in time, an orientation of a vertical direction in a reference frame attached to said portable device;
    calculating, for each said moment in time, an angle formed by the orientation of said vertical direction in said reference frame and a reference orientation;
    detecting a manipulation when said angle exceeds a first threshold; and
    subsequent to the detection of said manipulation, determining that it is in progress for a given period of time.

20. The device of claim 15, wherein generating the second signal comprises determining, based on a comparison of spectral lines in an acceleration signal generated during the second time interval, whether a maximum power spectral density of the acceleration signal is associated with a manipulation.

* * * * *